United States Patent
Bursell et al.

(10) Patent No.: US 11,816,205 B2
(45) Date of Patent: Nov. 14, 2023

(54) DETECTING AND HANDLING ATTACKS ON PROCESSES EXECUTING WITHIN A TRUSTED EXECUTION ENVIRONMENT

(71) Applicant: RED HAT, INC., Raleigh, NC (US)

(72) Inventors: Michael Hingston McLaughlin Bursell, Farnborough (GB); Nathaniel P. McCallum, Nicholasville, KY (US)

(73) Assignee: Red Hat, Inc., Raleigh, NC (US)

( * ) Notice: Subject to any disclaimer, the term of this patent is extended or adjusted under 35 U.S.C. 154(b) by 222 days.

(21) Appl. No.: 17/107,753

(22) Filed: Nov. 30, 2020

(65) Prior Publication Data

US 2022/0171847 A1    Jun. 2, 2022

(51) Int. Cl.
*G06F 21/54* (2013.01)
*G06F 21/53* (2013.01)
*G06F 21/55* (2013.01)
*G06F 21/56* (2013.01)

(52) U.S. Cl.
CPC ............. *G06F 21/54* (2013.01); *G06F 21/53* (2013.01); *G06F 21/554* (2013.01); *G06F 21/566* (2013.01)

(58) Field of Classification Search
CPC ........ G06F 21/54; G06F 21/53; G06F 21/554; G06F 21/566
See application file for complete search history.

(56) References Cited

U.S. PATENT DOCUMENTS 10,044,740 B2    8/2018 Mohanty et al.
10,430,586 B1 *  10/2019 Paithane ............... G06F 21/566
2014/0223556 A1 * 8/2014 Bignon ............... G06F 9/45558
                                                          726/22
2015/0007316 A1 * 1/2015 Ben-Shalom ........... H04L 63/12
                                                          726/23
2015/0244717 A1 * 8/2015 Jin ........................ G06F 9/5077
                                                          726/4
2018/0107826 A1 * 4/2018 Ellis ..................... G06F 21/53
2019/0007436 A1 * 1/2019 Dods ................... H04L 63/1425
2019/0068555 A1 * 2/2019 Tsirkin ................ H04L 63/0236
2019/0109874 A1   4/2019 Samuel et al.
2021/0049031 A1 * 2/2021 Halcrow ............... G06F 9/5077
2022/0067150 A1 * 3/2022 Karame ................. G06F 21/53

FOREIGN PATENT DOCUMENTS

WO        2018090934 A1    5/2018

OTHER PUBLICATIONS

"GitHub", https://github.com/enarx/enarx/issues/337, downloaded Oct. 23, 2020, 3 pages.

* cited by examiner

*Primary Examiner* — Trong H Nguyen
(74) *Attorney, Agent, or Firm* — Lowenstein Sandler LLP (57) ABSTRACT

Systems and methods for detecting and handling attacks on processes executing within a trusted execution environment (TEE) are disclosed. In one implementation, a processing device may detect by a first process an event indicating that a first process executing in a TEE of a host computer system is under attack from a second process executing on the host computer system. the processing device may set a flag within a memory region of the TEE indicating that the first process is under attack. The processing device may further perform, in view of an attack response policy associated with the first process, an action responsive to detecting the event.

20 Claims, 8 Drawing Sheets

DETECTING AND HANDLING ATTACKS ON PROCESSES EXECUTING WITHIN A TRUSTED EXECUTION ENVIRONMENT

TECHNICAL FIELD

The present disclosure is generally related to computer systems, and more particularly, to detecting and handling attacks on processes executing within a trusted execution environment.

BACKGROUND

Cloud computing defines a model for enabling ubiquitous, convenient, on-demand network access to a shared pool of configurable computing resources (e.g., networks, servers, storage, applications, and services) that can be rapidly provisioned and released with minimal management effort or service provider interaction. Essential characteristics of the cloud computing model include on demand self-service, broad network access, resource pooling, rapid elasticity and measured service. The cloud computing model comprises several service models, including Software as a Service (SaaS), Platform as a Service (PaaS), and Infrastructure as a Service (IaaS). The cloud computing model may be implemented according to one of several deployment models, including private cloud, community cloud, public cloud and hybrid cloud.

BRIEF DESCRIPTION OF THE DRAWINGS

The present disclosure is illustrated by way of examples, and not by way of limitation, and may be more fully understood with references to the following detailed description when considered in connection with the Figures, in which.

DETAILED DESCRIPTION

Described herein are methods and systems for detecting and handling attacks on processes executing within a trusted execution environment (TEE). A TEE may be an isolated execution environment, within a host computer system, providing security features such as isolated execution, integrity of applications executing with the TEE, and confidentiality of their data. Many computing environments are configured to provide on-demand availability of computing resources to consumers without direct management by the consumers. An example of this configuration is cloud computing. Cloud computing defines a computing environment model for enabling ubiquitous, convenient, on-demand network access to a shared pool of configurable computing resources (e.g., networks, servers, storage, applications, and services) that can be utilized by multiple processes hosted within the computing environment. In a cloud computing environment, the computing resources may be hosted by an entity and made available to multiple consumers over the Internet, which is often represented as a cloud.

Given that multiple processes may be hosted within the same computing environment thus sharing the computing resources of the environment, a risk may arise where a malicious process that is hosted within the computing environment may expose other processes to an attack targeting data and/or execution path of the targeted process. A TEE supports confidentiality and isolation of the various processes running in the cloud environment and may be deployed at each host of the cloud environment, enabling secured execution of the processes as well as encrypted memory for use by respective tenants. However, the risk of a malicious process may still impact another process that is hosted within the same local host as the malicious process (e.g., by utilizing and manipulating shared memory and other resources of the host). Accordingly, a technique for detecting and handling attacks that may arise within the computing environment may be desired.

The present disclosure alleviates the above-noted and other deficiencies by providing techniques for detecting and responding to attacks on a process executing within a trusted execution environment (TEE) of a host computer system. In one implementation, a process may be an infrastructure process within which software applications can be executed. An infrastructure process may provide, to the software applications hosted within the infrastructure environment, access to underlying physical or virtual processors, memory, and I/O devices. In an illustrative example, an infrastructure process may be an operating system process providing runtime infrastructure capabilities to applications running within the operating system. In another example, the infrastructure process may be a Java virtual machine providing runtime infrastructure to a Java application or applet. The infrastructure process may further be a container in a virtualized or physical environment, under which container applications may be executed.

In an implementation, an infrastructure process running within a TEE may detect a certain event indicating that the infrastructure process may be under attack from another process running on the same host system. Certain events related to execution on the host system may provide an indication that the infrastructure process is under attack. In certain implementations, such events may include a delay, that exceeds a certain threshold, in executing commands of the infrastructure process, unexpected return values from operations performed by the infrastructure process, an exit command from the infrastructure process that is rejected by the host, an expected network or storage access privilege being blocked, or any other events indicating that an operation of the process is not executing as expected. Because these event may be indicative of an abnormal behavior in the execution environment, upon detecting one or more of these events, the infrastructure process may determine that it is under an attack from another process executing at the host. An attack may refer to a malicious interference with execution of the infrastructure process in a way that may result in data corruption, undesirable execution of harmful tasks, data exploitation, and the like. In this case, the infrastructure process may raise a flag (e.g., an under attack flag) at a predetermined location within the TEE memory, indicating to the execution environment and to other processes within the execution environment that the infrastructure process is under attack. In one implementation, an administration service within the TEE may perform further investigations and may take further actions to detect, mitigate, and/or stop execution of the process initiating the attack.

Subsequent to raising the flag, the infrastructure process may perform one or more actions in response to the detected attack. In certain implementations, the infrastructure process may access an attack response policy to determine how to respond to the attack and which actions to perform. In an implementation, the infrastructure process may be able to determine the severity of the attack (e.g., based on the detected event(s) indicating the attack) and may select, based on the severity, an attack response policy from a set of attack response policies that are accessible to the infrastructure process. In an illustrative example, the under attack policy may include one or more actions to be performed by a process under attack including terminating execution, send a notification to one or more other processes running on the same host or within the same TEE and then terminate execution, save in-memory data then terminate execution, waiting for a predetermine period of time then exiting, declining to restart execution, or a combination thereof. Upon accessing the attack response policy, the infrastructure process may execute the one or more actions provided by the attack response policy. In an implementation, after terminating execution the infrastructure process may also decline to restart because the under attack flag is raised, thus further reducing the impact of the attack on the infrastructure process and its resources.

In another implementation, a software application running within a runtime infrastructure executing within a TEE of a host system may detect a certain event indicating that the application may be under attack from a process running on the same host system. A software application may refer to a process running within an operation system (which acts as the runtime infrastructure) deployed within the TEE of the host, a Java application running within a Java Virtual Machine (JVM) (as the runtime infrastructure) executing within the TEE, a container application running within a container (as the runtime infrastructure) deployed within the TEE, and the like. Certain events related to execution of the application may provide an indication that the application is under attack. In certain implementations, such events may include a delay that exceeds a certain threshold, in executing commands of the application, unexpected return values from operations performed by the application, an exit command from the application to runtime infrastructure having been rejected, an expected network or storage access privilege being blocked, or any other events indicating that an operation of the application is not executing as expected. Because these events may be indicative of an abnormal behavior in the execution environment, upon detecting one of these events, the application may determine that it is under an attack from another process executing at the host. An attack may refer to a malicious interference with execution of the application in a way that may result in data corruption, undesirable execution of harmful tasks, data exploitation, and the like. In this case, the application may send a request to the runtime infrastructure (e.g., to an administrative service executing at the runtime infrastructure) to raise the under attack flag that is accessible by infrastructure processes, thus notifying the runtime infrastructure that the application is under attack. In one implementation, in addition to raising the under attack flag, the administration service of the infrastructure may perform further actions in response to the attack detected by the application, and based on an attack response policy that is accessible by the infrastructure administrative service, as discussed herein above.

Subsequent to sending the request of setting the under attack flag to the administrative service, the application may perform one or more actions in response to the detected attack. In certain implementations, the application may access an attack response policy to determine how to respond to the attack and which actions to perform. In an implementation, the application may be able to determine the severity of the attack (e.g., based on the detected event indicating an attack) and may select an attack response policy from a set of attack response policies that are accessible to the application. In an illustrative example, the under attack policy may include one or more actions to be performed by a process under attack including terminating execution, save in-memory data then terminate execution, send one or more network packets to a pre-determined storage location indicating that the application is under attack, wait for a predetermine period of time then exit, decline to restart execution, or a combination thereof. Upon accessing the attack response policy, the application may execute the one or more actions provided by the attack response policy. In one implementation, in addition to executing the attack response policy, the application may further notify other applications running within the runtime infrastructure that the application is under attack. In an implementation, after terminating execution the application may also decline to restart if the application detects that the under attack flag of the runtime infrastructure is raised, thus further reducing the impact of the attack on the application.

Thus, the systems and methods described herein represent improvements to the functionality of computing environments, by detecting event that are indicative of an attack on a process executing at a TEE, and registering the detected attack within the TEE, so that it may be addressed. The ability to detect an attack by monitoring for certain events to occur and then raising an under attack flag within the could environment improves the security and reliability of the cloud environment because it enables a process that is under attack to detect and respond to the attack as early as possible, before the process becomes under the control of the attacking process. The early detection and response to the attack may further prevent the attacker to reach other processes within the TEE because the other processes running on the same host and within the same TEE will be notified of the attack and may take certain measures to mitigate the attack. For example, a process running within the same TEE may terminate or may decline to restart, upon finding that a peer process is under attack. Additionally, the ability to raise an under attack flag within the TEE environment further improves the robustness of the attack handing module of the computing environment because it will continue to be raised until the attack is addressed by an administrative process of the computing environment. The raised flag also enables processes to reject an attempt to restart after terminating, thus preventing an attempt by the attacking process to restart the process under attack after it has been terminated.

The systems and methods described herein may be implemented by hardware (e.g., general purpose and/or specialized processing devices, and/or other devices and associated circuitry), software (e.g., instructions executable by a processing device), or a combination thereof. Various aspects of the above referenced methods and systems are described in details herein below by way of examples, rather than by way of limitation.

Figure 1:
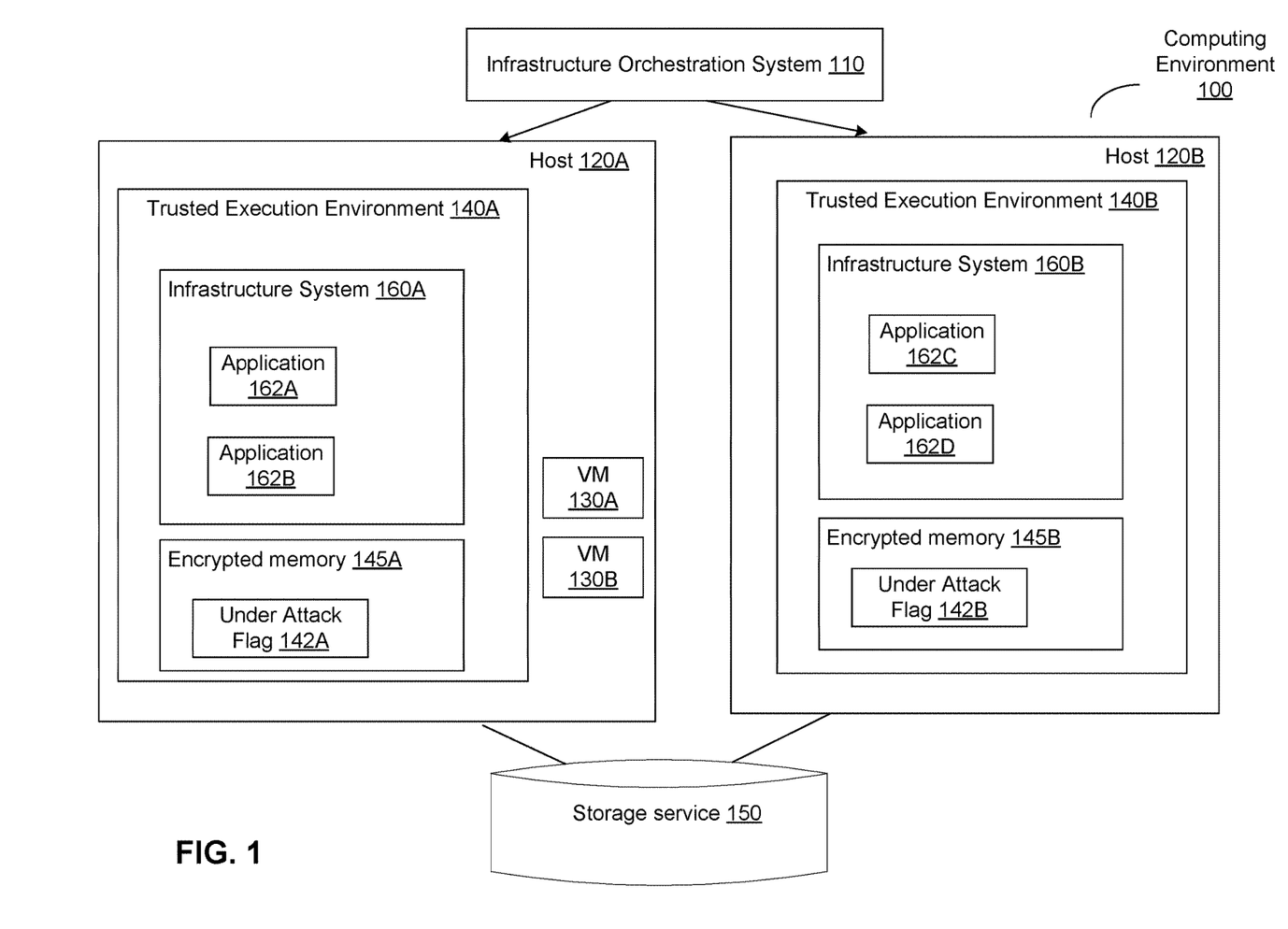
FIG. 1 illustrates an exemplary computing environment in which implementations of the disclosure may operate.

FIG. 1 schematically depicts a high-level component diagram of an example computing environment 100 implemented in accordance with one or more aspects of the present disclosure. Computing environment 100 may refer to cloud computing device (e.g., host machine, virtual machine, container), a distributed computing device (e.g., edge computing node), another computing device, or a combination thereof. In certain implementations, computing device 100 may include one or more computing devices at a single physical location (e.g., data center) or across multiple physical locations (e.g., different data centers). In one example, computing environment 100 may include infrastructure orchestration system 110, host systems 120A-B, and storage service 150.

Infrastructure orchestration system 110 may manage the computing environment resources. In some implementations, infrastructure orchestration system 110 may further perform the functions of a software provisioning controller operating in accordance with one or more aspects of the present disclosure. Infrastructure orchestration system 110 may manage deployment, configuration, and maintenance of the host computers and virtual machines. Infrastructure orchestration system 110 may implement fine-grained life cycle management, user and group role-based access control, integrated subscription management, as well as advanced graphical user interface (GUI), command line interface (CLI), and/or API access.

While in the illustrative example of FIG. 1 infrastructure orchestration system 110 is shown as running on a separate physical machine, in various alternative implementations infrastructure orchestration system 110 may be co-located with one of hosts 120A-B.

Computing environment 100 may further include one or more host computer systems 120A-120B, on which virtual machine instances 130A-130B may run. In some implementations, hosts 120A-B may be physical servers (e.g., physical machines), virtual servers (e.g., implementing a hypervisor and virtual machines, containers), or a combination thereof. One or more of the hosts may be absent virtualization technology and one or more of the hosts may provide one or more levels of virtualization. The levels of virtualization may include hardware level virtualization, operating system level virtualization, other virtualization, or a combination thereof. The hardware level virtualization may involve a hypervisor (e.g., virtual machine monitor) that emulates portions of a physical system and manages one or more virtual machines. In contrast, operating system level virtualization may include a single operating system kernel that manages multiple isolated virtual containers. Each virtual container may share the kernel of the underlying operating system without requiring its own kernel.

Trusted execution environments (TEEs) 140A-B may be a set of one or more computing processes, threads, or instruction streams and in one example it may be a set with a single process (e.g., user process) and in another example it may be a set of multiple processes (e.g., all processes of a particular virtual machine). The trusted execution environment may be implemented by one or more processors coupled to a storage device (e.g., memory). The processor may protect data of the set of processes from being accessed by other processes that may be more or less privileged. For example, in a trusted execution environment a central processing processor (CPU) may guard data of a lower privileged process (e.g., user process or virtual machine process) from being accessed by a higher privileged process (e.g., kernel process or hypervisor process). The data being guarded may include executable data (e.g., code), non-executable data (e.g., input data or output data), other data, or a combination thereof. In some examples, trusted execution environments 140A-B may be provided by special instructions and features of the processor and may be the same or similar to Software Guard eXtensions (SGX)® provided by Intel®, TDX provided by Intel®, Memory Encryption Technology provided by AMD® (e.g., Secure Encrypted Virtualization (SEV)®, Secure Memory Encryption (SME, SME-ES), TrustZone® provided by ARM®, other technology, or a combination thereof. In some or all of these examples, the processor may guard the data by establishing one or more encrypted memory regions 145A-B.

Each of the trusted execution environments 140A-B may include one or more trusted execution environment instances (e.g., TEE instances). An instance of the trusted execution environment may be established for a particular set of one or more processes and may be associated with a particular memory encrypted region. The instances of a trusted execution environment may be provided by the same hardware (e.g., processor and memory) but each instance may be associated with a different memory encrypted region and a different set of one or more processes (e.g., set including an individual process or set of all processes within a container). As shown in FIG. 1, trusted execution environments 140A-B may be provided by a respective host system that may guard data associated with a particular instance using one or more encrypted memory regions 145A-B.

TEE 140A-B may host various processes at runtime such that the processes may execute within the trusted environment. Hosted processes may include container or infrastructure processes (e.g., infrastructure system 160A-B) that may host other applications and processes. Software applications may also be directly provisioned to the TEE (e.g., processes executing a workload from a tenant of the TEE). Infrastructure system 160A-B may refer to a layer of software within which other applications and processes may execute such that the infrastructure layer may provide computing resources to the processes running within including access to network, storage, file system, and the like. The infrastructure layer may also manage access of these resources by the hosted processes and may further act as a proxy for directing commands from the hosted processes to the TEE and the local host. Examples of infrastructure system 160A-B include an operation system deployed to TEE 140A-B, a Java Virtual Machine (JVM) executing within TEE 140A-B, a container deployed to TEE 140A-B, etc. as shown in FIG. 1, infrastructure system 160A-B may include applications 162A-D that are executing within one of the infrastructure systems.

In one implementation, an administrative process running within infrastructure system 160A-B (hereinafter infrastructure process) may detect a certain event indicating that the infrastructure process may be under attack from another process running on host system 120A-B. As an example, such events may include a delay exceeding a certain threshold in executing commands of the infrastructure process, unexpected return values from operations performed by the infrastructure process, an exit command from the infrastructure process to host 120A-B that is rejected by host, an expected network or storage access privilege is blocked, or any other events indicating that an operation of the process is not executing as expected. The infrastructure process may set under attack flag 142A-B, indicating to TEE 140A-B and to other processes within the execution environment that the infrastructure process is under attack. In one implementation, under attack flag 142A-B may be cleared when TEE 140A-B is provisioned. The under attack flag may be represented by a sequence of one or more bits that the process may store in a predetermined memory location. In some implementations, the predetermined memory location may be supplied by a configuration parameter of the infrastructure process. The bit sequence representing the under attack flag may encode the identifier of the infrastructure process, the type and/or severity of the attack, and/or other relevant information.

In addition to setting under attack flag 142A-B, the infrastructure process may perform one or more actions in response to the detected attack, and according to an attack response policy that is accessible to the infrastructure process. In certain implementations, the performed actions may be determined according to the severity of the attack. As an example, an attack that is detected due to an exit command being rejected by the host may be of a higher severity than an attack that is detected due to a delay in performing a certain operation. In an illustrative example, the under attack policy may include the actions to be performed by the infrastructure process being attacked including terminating execution, send a notification to one or more other processes and then terminate execution, wait for a predetermine period of time then exit, decline to restart execution, or a combination thereof. The infrastructure process may execute the one or more actions provided by the attack response policy.

Application 162A-D may refer to an executable running within infrastructure system 160A-B to perform certain functions or tasks. As an example, application 160A-D may be a software application running within an operation system representing infrastructure system 160A-B, a Java application running within a Java Virtual Machine (JVM) representing infrastructure system 160A-B, a container application running within a container representing infrastructure system 160A-B. Application 160A-D may also be capable of detecting events that are indicative of an attack on the application from a certain process running within host 120A-B. In some implementations, application 160A-D running within infrastructure system 160A-B may detect a certain event indicating that application 160A-D may be under attack from a process running on host 120A-B. In certain implementations, detected events may include a delay, that exceeds a certain threshold, in executing commands of application 160A-D, unexpected return values from operations performed by application 160A-D, an exit command from application 160A-D to infrastructure system 160A-B that is rejected, an expected network or storage access privilege is blocked, or any other events indicating that an operation of application 160A-D is not executing as expected. Application 160A-D may then send a request to infrastructure system 160A-B (e.g., to an administrative service executing at the infrastructure system) set under attack flag 142A-B that is accessible by infrastructure system 160A-B.

Further to sending the request of setting under attack flag 142A-B to infrastructure system 160A-B, application 160A-D may perform one or more actions in response to the detected attack, as determined by an attack response policy of application 160A-D. In certain implementations, the performed actions may be determined according to the severity of the attack. In an illustrative example, the under attack policy may include one or more actions to be performed by application 160A-D including terminating execution, save in-memory data then terminate execution, send one or more network packets to a pre-determined storage location indicating that the application is under attack, wait for a predetermine period of time then exit, decline to restart execution, or a combination thereof. Application 160A-D may execute the one or more actions provided by the attack response policy. In one implementation, in addition to executing the attack response policy, application 160A-D may further notify other applications running within infrastructure system 160A-B that the application is under attack.

Encrypted memory regions 145A-B may be regions of memory that are assigned to a set of one or more processes and that store data in an encrypted form. The data may be encrypted and decrypted by hardware devices using cryptographic keys that are accessible to the hardware devices and may be inaccessible to processes executed by the hardware devices, this may be the same or similar to hardware based encryption, hardware level encryption, other term, or a combination thereof. The hardware devices may include one or more general purpose processors (e.g., CPUs), graphical processing units (GPUs), secure elements (SE), secure cryptoprocessors, memory controller, other integrated circuit, or a combination thereof.

The encrypted memory region may be a contiguous or non-contiguous portion of physical memory, virtual memory, logical memory, or other abstraction and may a portion of primary memory (e.g., main memory), auxiliary memory (e.g., solid state storage), adapter memory, other persistent or non-persistent storage, or a combination thereof. In one example, the encrypted memory region may be a portion of main memory associated with a particular process and the processor may encrypt the data when storing the data in the memory region and may decrypt the data when accessing the data in the memory region. The data in the memory region may be transformed (e.g., encrypted or decrypted) before, during, or after it is stored in or accessed from the memory region. The data may remain in an encrypted form while in the encrypted memory region and may or may not remain in an encrypted form when stored within the processor.

The shared storage service 150 may be implemented by one or more storage nodes, one or more container servers to manage mappings of object containers, one or more object servers to manage objects (such as files) on the storage nodes, and one or more authentication servers to manage accounts defined within the object storage service. In some implementations, the shared storage service may further implement one or more software repositories for storing virtual machine images, operating system code and metadata, application code and metadata, workload images, software update code and metadata, or a combination thereof.

Computing environment 100 may include one or more networks. The one or more networks may include a public network (e.g., the internet), a private network (e.g., a local area network (LAN) or wide area network (WAN)), or a combination thereof. In one example, the network may include a wired or a wireless infrastructure, which may be provided by one or more wireless communications systems, such as a wireless fidelity (WiFi) hotspot connected with the network and/or a wireless carrier system that may be implemented using various data processing equipment, communication towers, etc.

Figure 2:
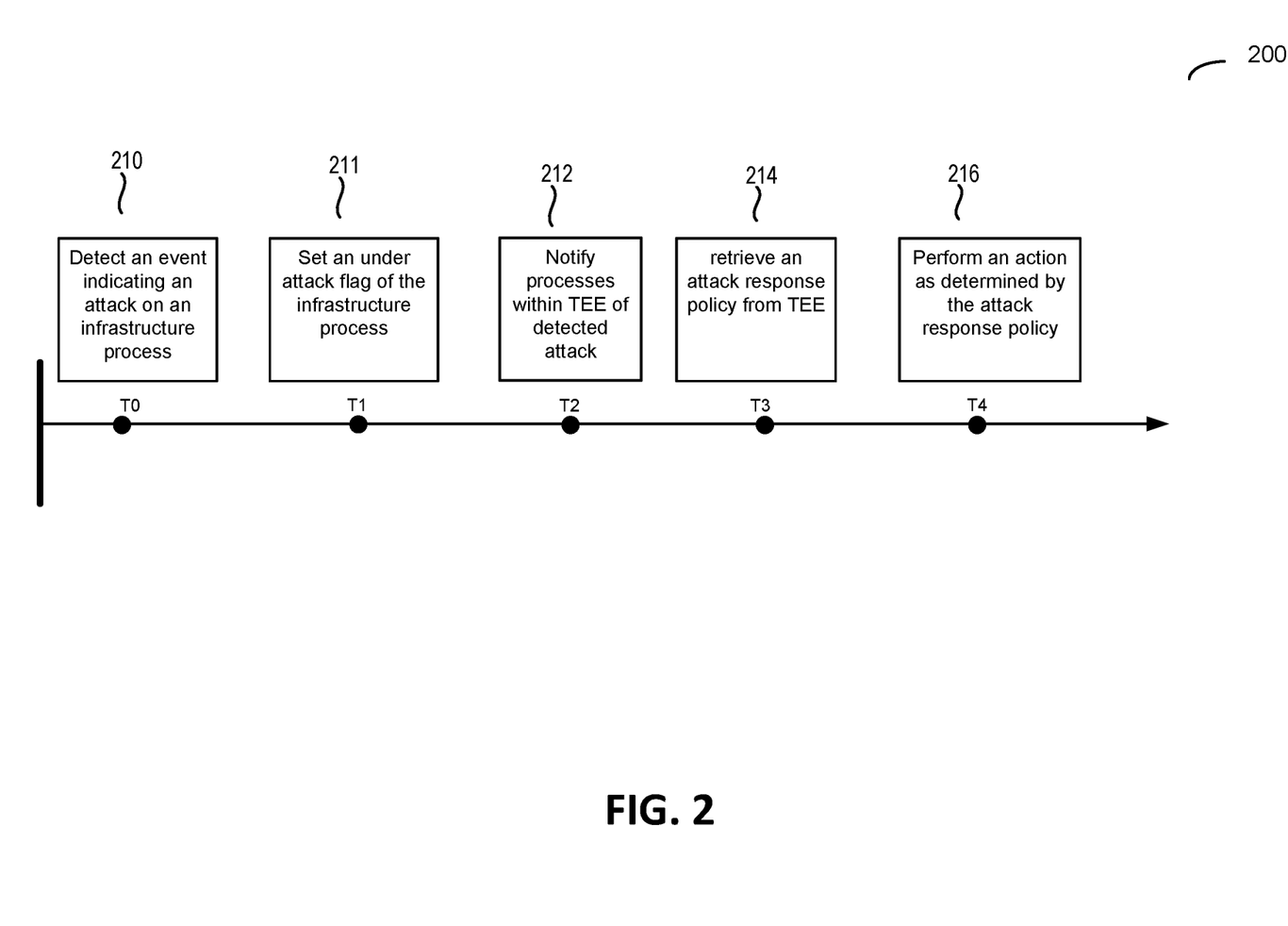
FIG. 2 depicts a sequence diagram illustrating an example method of detecting and responding to an attack on an infrastructure process in a trusted execution environment (TEE) of a host computer system, in accordance with one or more aspects of the present disclosure.

FIG. 2 depicts a sequence diagram illustrating an example method 200 of detecting and responding to an attack on an infrastructure process in a trusted execution environment (TEE) of a host computer system, in accordance with one or more aspects of the present disclosure. Method 200 may be performed by processing logic that includes hardware (e.g., circuitry, dedicated logic, programmable logic, microcode, etc.), software (e.g., instructions run on a processor to perform hardware simulation), or a combination thereof. Method 200 or each of its individual functions, routines, subroutines, or operations may be performed by one or more processors of a computer system (e.g., computing environment 100 of FIG. 1) implementing the method. In an illustrative example, method 200 may be performed by a single processing thread. Alternatively, method 200 may be performed by two or more processing threads, each thread implementing one or more individual functions, routines, subroutines, or operations of the method. In an illustrative example, the processing threads implementing method 200 may be synchronized (e.g., using semaphores, critical sections, or other thread synchronization mechanisms).

Method 200 starts at operation 210. At operation 210 the processing logic at time T0 detects an event indicating that the infrastructure process is under attack. In an implementation, the attack may be initiated by another process hosted at the host computer system. As an example, the event indicating an attack may be that the infrastructure process made a request for a read operation from a file descriptor of the host system, and the requested read size was 4 Kilobyte but the received data size was 8 Kilobyte. Another example of an event indicating an attack is when the infrastructure process sends a request to the host to terminate execution but the request is denied or delayed.

At operation 211, the processing logic at time T1 sets an under attack flag, indicating to other processes within the TEE that the infrastructure process is under attack. In one implementation, when the under attack flag is set, the infrastructure process may further prevent a restart of the process after it terminates itself, until the flag is cleared (e.g., by an administrative process of the host system). In certain implementations, each infrastructure process running within the TEE may have a dedicated under attack flag.

At operation 212, the processing logic at time T2 may send, e.g., via a socket, a named pipe, or any other suitable inter-process communication mechanism, one or more notifications to other processes running within the TEE indicating that the infrastructure process is under attack. In certain implementations, knowing that a process is under attack, the other processes within the TEE may perform one or more actions, based on an attack response policies, to mitigate or prevent an attack on the remaining processes.

At operation 214, the processing logic at time T3 may retrieve an attack response policy, from a predetermined storage location within the TEE for example. The attack response policy may determine one or more actions to perform when an infrastructure process is under an attack. In an implementation, the infrastructure process may select an attack response policy from a set of attack response policies that are accessible to the infrastructure process, based on severity of the attack. In an illustrative example, an action determined by the attack response policy may include terminating the infrastructure process after saving in-memory data to persistent storage.

At operation 216, the processing logic at time T4 may perform the action determined by the attack response policy. In the illustrative example discussed above, the infrastructure process may complete any pending operations and may store data to persistent storage and then may terminate execution. In this case, the under attack flag of the infrastructure process continues to be set, indicating that the infrastructure process was exposed to an attack.

Figure 3:
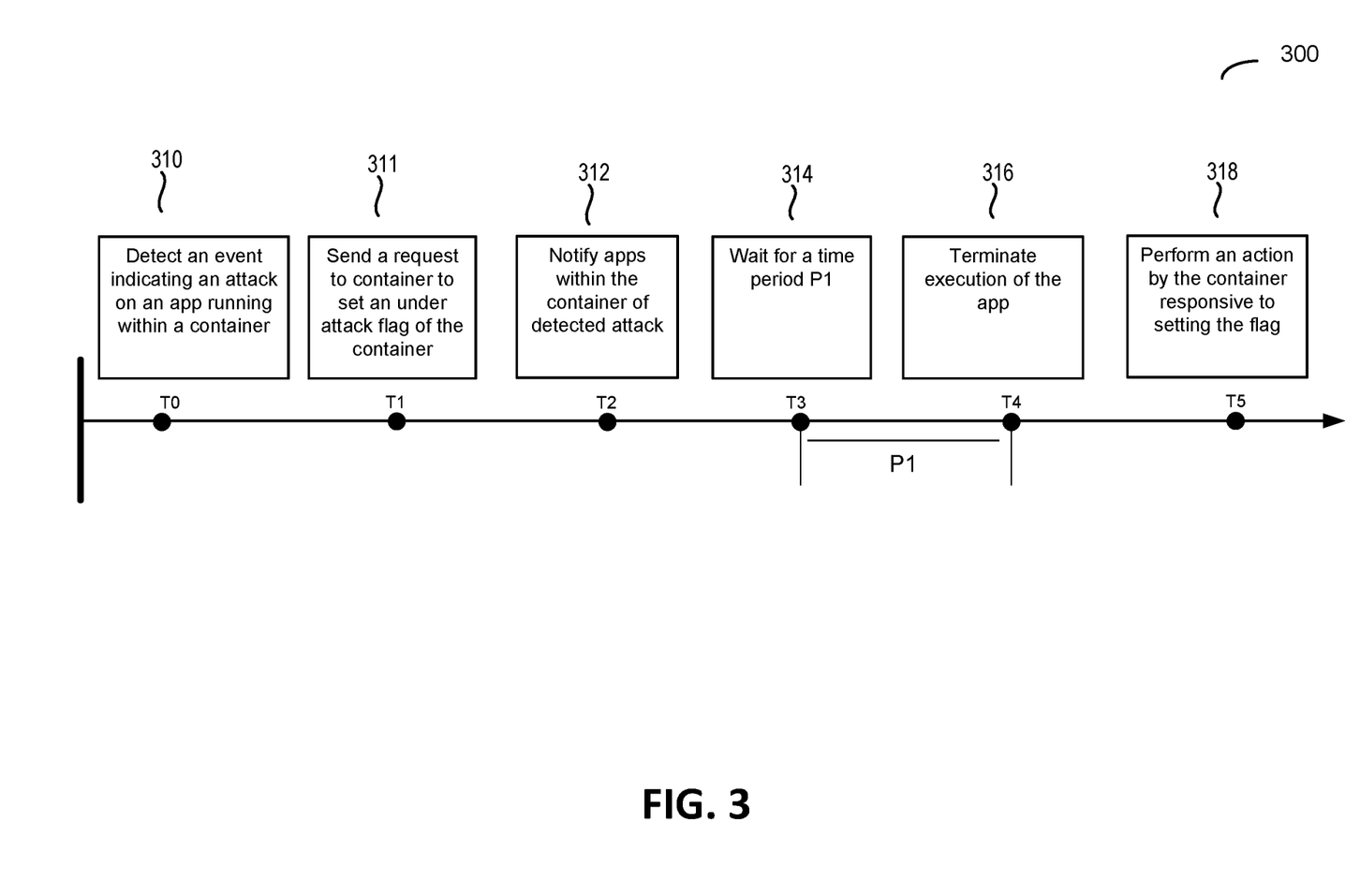
FIG. 3 depicts a sequence diagram illustrating an example method of detecting and responding to an attack on an application running within a container that is deployed in a trusted execution environment (TEE) of a host computer system, in accordance with one or more aspects of the present disclosure.

FIG. 3 depicts a sequence diagram illustrating an example method 300 of detecting and responding to an attack on an application running within a container that is deployed in a trusted execution environment (TEE) of a host computer system, in accordance with one or more aspects of the present disclosure. Method 300 may be performed by processing logic that includes hardware (e.g., circuitry, dedicated logic, programmable logic, microcode, etc.), software (e.g., instructions run on a processor to perform hardware simulation), or a combination thereof. Method 300 or each of its individual functions, routines, subroutines, or operations may be performed by one or more processors of a computer system (e.g., computing environment 100 of FIG. 1) implementing the method. In an illustrative example, method 300 may be performed by a single processing thread. Alternatively, method 300 may be performed by two or more processing threads, each thread implementing one or more individual functions, routines, subroutines, or operations of the method. In an illustrative example, the processing threads implementing method 300 may be synchronized (e.g., using semaphores, critical sections, or other thread synchronization mechanisms).

Method 300 starts at operation 310. At operation 310 the processing logic at time T0 detects an event indicating that the application is under attack. In an implementation, the attack may be initiated by another process hosted at the host computer system. As an example, the event indicating an attack may be that the application made a request to write data to a file stored at a storage device of the host, and the execution of the write operation is delayed by an amount of time that exceeds a certain threshold. Another example of an event indicating an attack is when the application sends an exit request to the host but the request is denied or delayed.

At operation 311, the processing logic at time T1 send a request to the container where the application is executing, requesting that the container sets an under attack flag, indicating to other processes within the TEE, and other applications within the container that the application is under attack. In one implementation, when the under attack flag is set, the container exit execution and may further reject to be restarted until the flag is cleared (e.g., by an administrative process of the host system). In certain implementations, each container within the TEE may have a dedicated under attack flag.

At operation 312, the processing logic at time T2 may send one or more notification to other applications within the container indicating that the application is under attack. In certain implementations, since the host controls access to all resources, the attack may impact or restrict access of the application to one or more resources, which may prevent the application from sending notifications by invoking a subroutine, for example. In this case, the application may send network packets to a predetermined storage location as a notification of the attack to a trusted process (e.g., as administrative process of the TEE).

At operation 314, the processing logic at time T3 may determine to wait for a predetermined time period P1 and then terminate execution of the application, in response to the attack. In an implementation, the action to wait for a certain time period then terminate may be determined by an attack response policy that is accessible to the application. In one implementation, the application may select an attack response policy from a set of attack response policies that are accessible to the application, based on severity of the attack.

At operation 316, after the time period P1 is elapsed, at time T4, the processing logic terminates the execution of the application. In one implementation, the application may reject an attempt to be restarted until the under attack flag is cleared. At operation 318, the processing logic at time T5 performs an action related to the container, in response to setting the under attack flag of the container. In some implementations, the action may be to terminate execution of the container, as discussed in more details in the description of FIG. 2.

Figure 4:
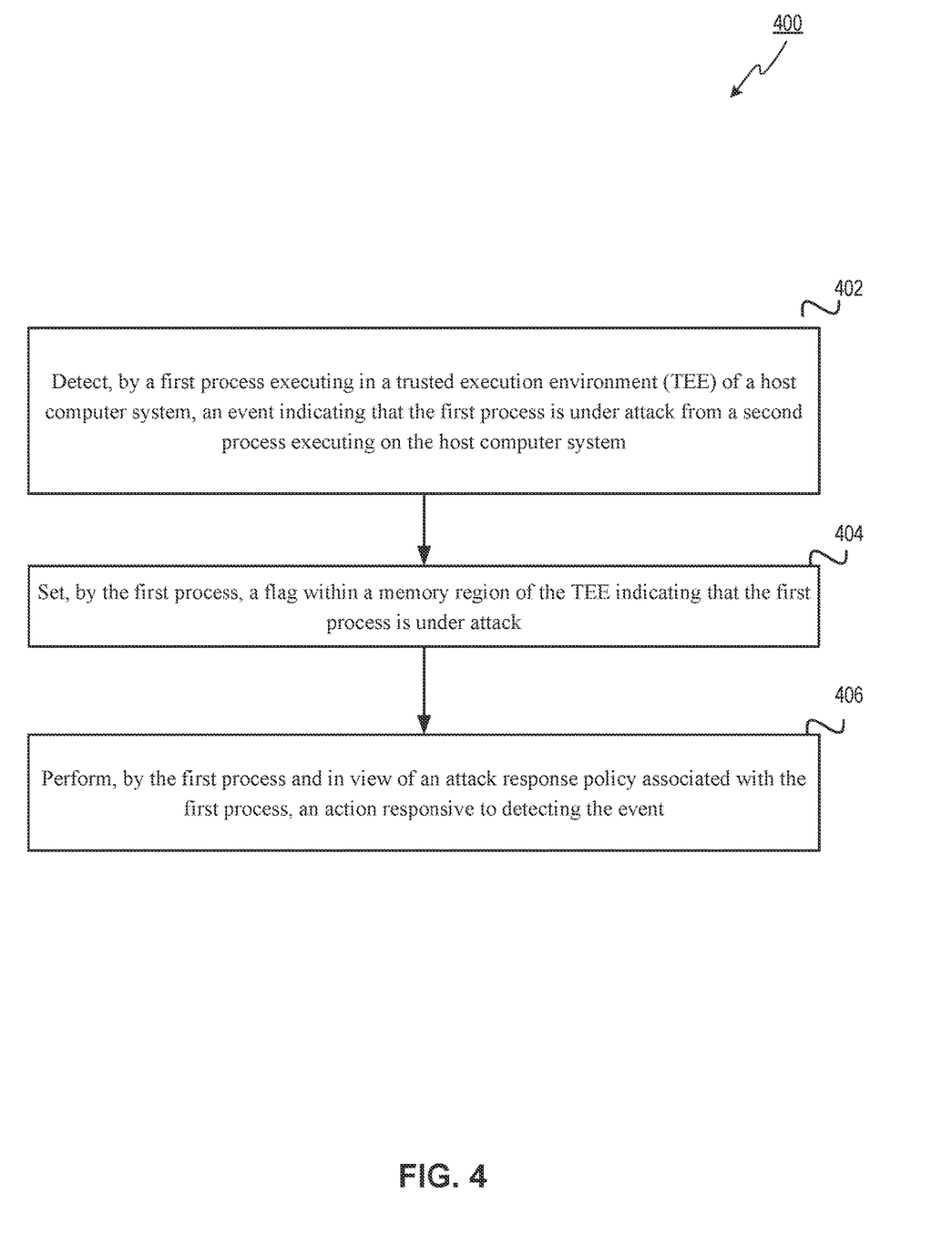
FIG. 4 is a flow diagram of an example method of detecting and responding to an attack on a process executing on a trusted execution environment (TEE), in accordance with one or more aspects of the present disclosure.

FIG. 4 is a flow diagram of an example method of detecting and responding to an attack on a process executing on a trusted execution environment (TEE), in accordance with one or more aspects of the present disclosure. Method 400 may be performed by processing logic that includes hardware (e.g., circuitry, dedicated logic, programmable logic, microcode, etc.), software (e.g., instructions run on a processor to perform hardware simulation), or a combination thereof. Method 400 or each of its individual functions, routines, subroutines, or operations may be performed by one or more processors of a computer system (e.g., the computer system 500 of FIG. 5 or apparatus 700 of FIG. 7) implementing the method. In an illustrative example, method 400 may be performed by a single processing thread. Alternatively, method 400 may be performed by two or more processing threads, each thread implementing one or more individual functions, routines, subroutines, or operations of the method. In an illustrative example, the processing threads implementing method 400 may be synchronized (e.g., using semaphores, critical sections, or other thread synchronization mechanisms). Alternatively, the processing threads implementing method 400 may be executed asynchronously with respect to each other. Therefore, while FIG. 4 and the associated description lists the operations of method 400 in certain order, various implementations of the method may perform at least some of the described operations in parallel or in arbitrary selected orders.

Referring to FIG. 4, at operation 402, the processing logic may detect an event indicating that a process executing in a trusted execution environment (TEE) of a host computer system is under attack from another process executing on the host computer system. In implementations, the process may be an infrastructure process executing directly within the TEE. In another implementation, the process may be a software application executing within an infrastructure system that is deployed on the TEE, as explained in more details herein.

At operation 404, the processing logic may set an under attack flag within a memory region of the TEE indicating that the process is under attack. In one implementation, the flag may continue to be set until an administrative service resets the process (e.g., until an administrative service of the TEE re-provision the process to the TEE).

At operation 406, the processing logic may perform an action corresponding to detecting the event. The action may be determined by an attack response policy that is accessible to the process, as explained in more details herein. In certain implementations, the attack response policy may determine more than one actions to executed sequentially or in parallel by a process that is under an attack.

For simplicity of explanation, the methods of this disclosure are depicted and described as a series of acts. However, acts in accordance with this disclosure may occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Each method described herein and/or each of its individual functions, routines, subroutines, or operations may be performed by one or more processing devices of the computer system (e.g., computing environment 100 of FIG. 1) implementing the method. In certain implementations, the method may be performed by a single processing thread. Alternatively, the method may be performed by two or more processing threads, each thread executing one or more individual functions, routines, subroutines, or operations of the method. In an illustrative example, the processing threads implementing the method may be synchronized (e.g., using semaphores, critical sections, and/or other thread synchronization mechanisms). Alternatively, the processing threads implementing the method may be executed asynchronously with respect to each other.

Figure 5:
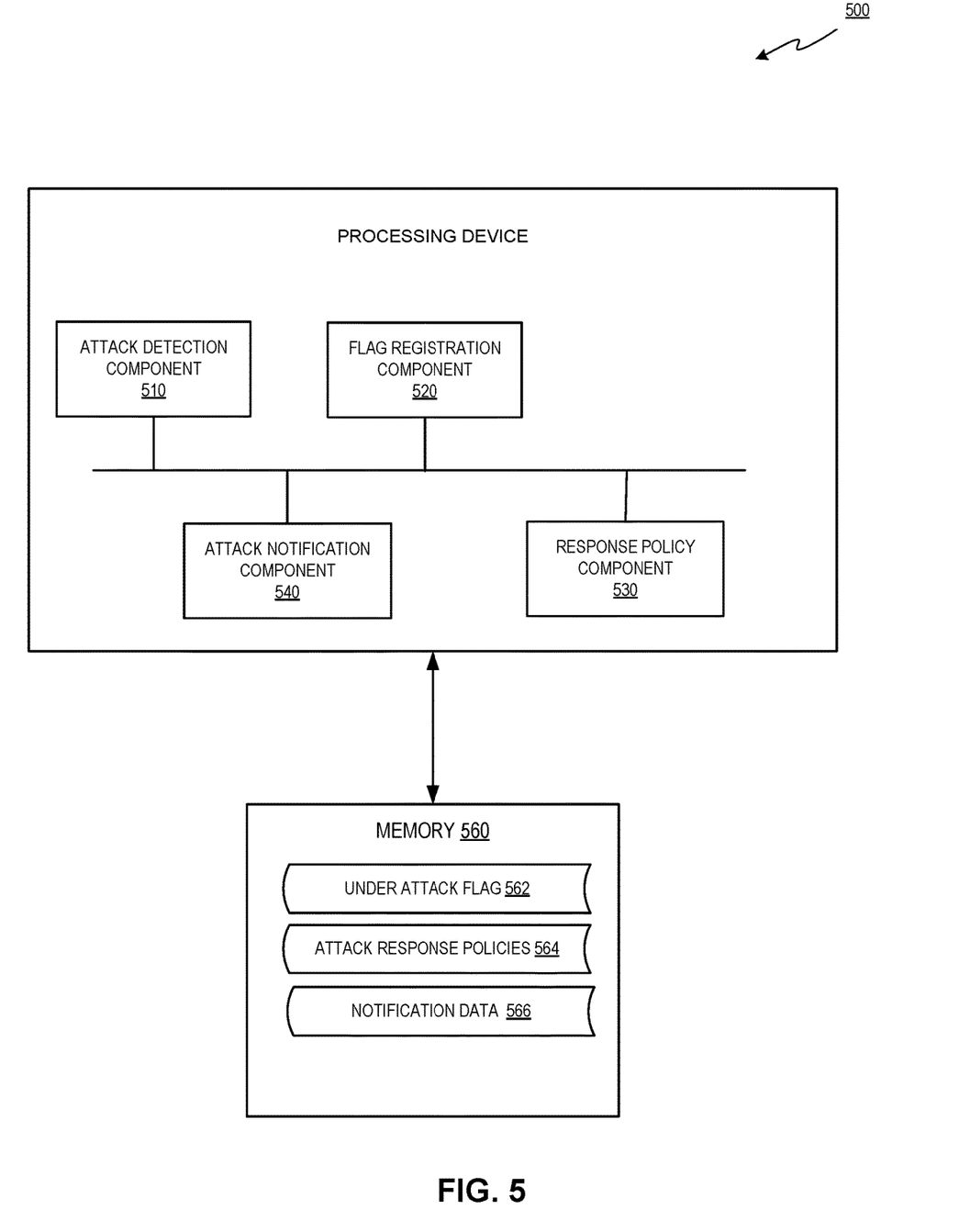
FIG. 5 depicts a block diagram of an example computer system in accordance with one or more aspects of the present disclosure

FIG. 5 depicts a block diagram of an example computer system 500 in accordance with one or more aspects of the present disclosure. Computer system 500 may include one or more processing devices and one or more memory devices. In the example shown, computer system 500 may include attack detection component 510, flag registration component 520, response policy component 530, and notification component 540. Components of computer system 500 may access memory 560 to implement methods in accordance to aspects of the disclosure.

Attack detection component 510 may enable a processing device of computer system 500 to detect an event that occur to a process executing within a trusted execution environment (TEE) of a host system, indicating that the process is under attack from another process executing at the host system. In an implementation, a process may be an infrastructure process within which software applications can be executed (e.g., a JVM, a container, an operating system, etc.) In another implementation, the process may be a software application (e.g., a Java application) running within an infrastructure system executing at the TEE. In an implementation, attack detection component 510 may detect that one of a pre-determined events that are indicative of an attack on the process. In some implementations, such events may include a delay, that exceeds a certain threshold, in executing commands of the process, unexpected return values from operations performed by the process, an exit command from the process to host that is rejected by host, an expected network or storage access privilege is blocked, or any other events indicating that an operation of the process is not executing as expected. Attack detection component 510 may then utilize flag registration component 520 to set a flag corresponding to the detected attack.

Flag registration component 520 may be responsible for setting under attack flag 562 within memory 560, indicating that the process is under attack. In one implementation, under attack flag 562 may be represented by a sequence of one or more bits that is stored in a predetermined memory location at memory 560. In some implementations, the predetermined memory location may be supplied by a configuration parameter of the process. The bit sequence representing under attack flag 562 may encode the identifier of the process, the type and/or severity of the attack, and/or other relevant information.

In an implementation, when the process is an application running within an infrastructure system, the application may not have access to set under attack flag 562 directly. In this case, flag registration component may send a request, for setting under attack flag 562, to an administrative service of the infrastructure system hosting the process. In an implementation, under attack flag 562 may not be cleared until the TEE environment is re-provisioned, to ensure that the potential attack has been addressed. After setting under attack flag 562, attack notification component 540 may be used for notifying other processes and application that the process is under attack.

Notification component 540 may be responsible for sending notification to one or more trusted parties indicating that the process is under attack. In one implementation, notification component 540 may send notification data 566 indicating that the process is under attack, by invoking a pre-determined system call to the TEE or the hosting environment. In this case, notification data 566 may be a memory buffer containing predetermined contents that are indicative of the attack including at least one of an event identification of the event indicating the attack, date and time of the attack, a severity of the attack, or a process that may be initiating the attack. In another implementation, notification component 540 may send network packets to a pre-determined storage location indicating that the process is under attack. In this case, notification data 566 may be the outgoing data of the network packet and may include a network address as a receiver of the notification network packet.

Response policy component 530 may be responsible for accessing one or more attack response policies 564 by a process that is under attack from another process. In some implementations, response policy component 530 may perform one or more actions in response to a detected attack on a process executing within the TEE. In certain implementations, response policy component may include one or more policies for determining one or more actions to be performed by a process under attack. In an implementation, the each attack response policy may correspond to a specific severity of the attack. In an illustrative example, each policy within attack response policies 564 may include one or more actions to be performed by a process in response to detecting an attack. The one or more actions may include terminating execution, send a notification to one or more other processes and then terminate execution, save in-memory data then terminate execution, wait for a predetermine period of time then exit, decline to restart execution, or a combination thereof. Upon determining an attack response policy to execute, response policy component 530 may execute the one or more actions provided by the selected attack response policy.

Figure 6:
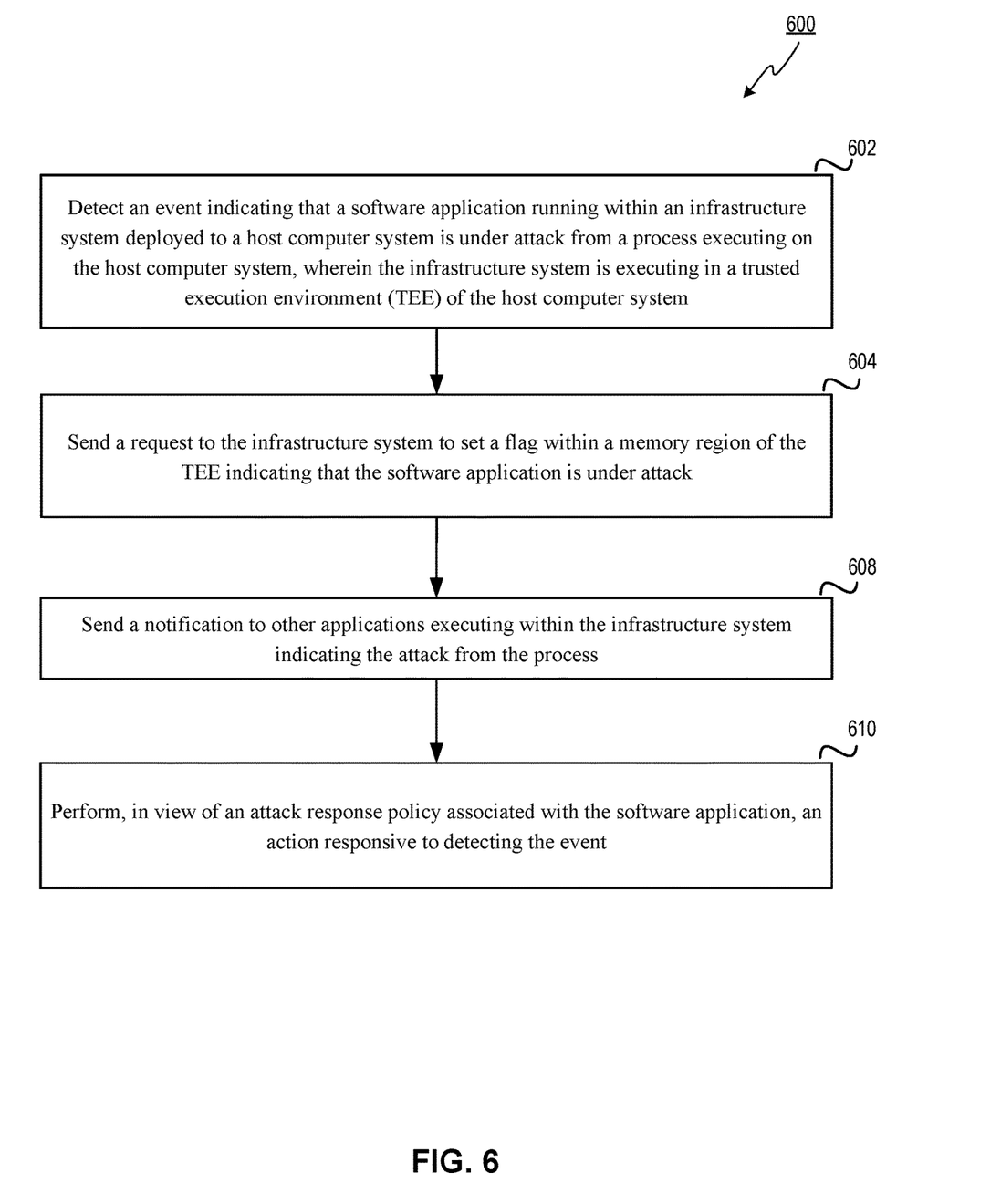
FIG. 6 is a flow diagram of an example method of detecting and responding to an attack on a software application executing within an infrastructure system that is deployed on a trusted execution environment (TEE), in accordance with one or more aspects of the present disclosure.

FIG. 6 is a flow diagram of an example method of detecting and responding to an attack on a software application executing within an infrastructure system that is deployed on a trusted execution environment (TEE), in accordance with one or more aspects of the present disclosure. Method 600 may be performed by processing logic that includes hardware (e.g., circuitry, dedicated logic, programmable logic, microcode, etc.), software (e.g., instructions run on a processor to perform hardware simulation), or a combination thereof. Method 600 or each of its individual functions, routines, subroutines, or operations may be performed by one or more processors of a computer system (e.g., the computer system 500 of FIG. 5 or apparatus 700 of FIG. 7) implementing the method. In an illustrative example, method 600 may be performed by a single processing thread. Alternatively, method 600 may be performed by two or more processing threads, each thread implementing one or more individual functions, routines, subroutines, or operations of the method. In an illustrative example, the processing threads implementing method 600 may be synchronized (e.g., using semaphores, critical sections, or other thread synchronization mechanisms). Alternatively, the processing threads implementing method 600 may be executed asynchronously with respect to each other. Therefore, while FIG. 6 and the associated description lists the operations of method 600 in certain order, various implementations of the method may perform at least some of the described operations in parallel or in arbitrary selected orders.

At operation 602, the processing logic may detect an event indicating that a software application running within an infrastructure system deployed to a host computer system is under attack from a certain process executing on the host computer system. The infrastructure system of the software application is executing in a trusted execution environment (TEE) of the host computer system (e.g., the infrastructure system may be a Java virtual machine executing within a TEE and the software application may be a Java application running within the Java virtual machine).

At operation 604, the processing logic may send a request to the infrastructure system to set a flag within the memory region of the TEE indicating that the software application is under attack. In an implementation, the under attack flag is accessible to the infrastructure system, rather than to applications running within the infrastructure system and indicates that one or more applications within the infrastructure system may be under attack.

At operation 608, the processing logic may send notifications to other applications executing within the infrastructure system indicating the attack from the process hosted within the host computer system. in some implementations, the notifications may be sent via one or more network packets that the application can transmit to a pre-determined location, indicating to one or more trusted processes that the application is under attack, as explained in more details here.

At operation 610, the processing logic may perform an action responsive to detecting the event that indicates that the application is under attack. The action may be determined according to an attack response policy that is accessible to the application. As an example, the action may be at one least one of terminating execution of the application, wait for a predetermined time period then exit, or deny an attempt to restart the application. In one implementation, the attack response policy may be one of multiple attack response policies and may be selected based on a severity of the attack, as explained in more details herein.

Figure 7:
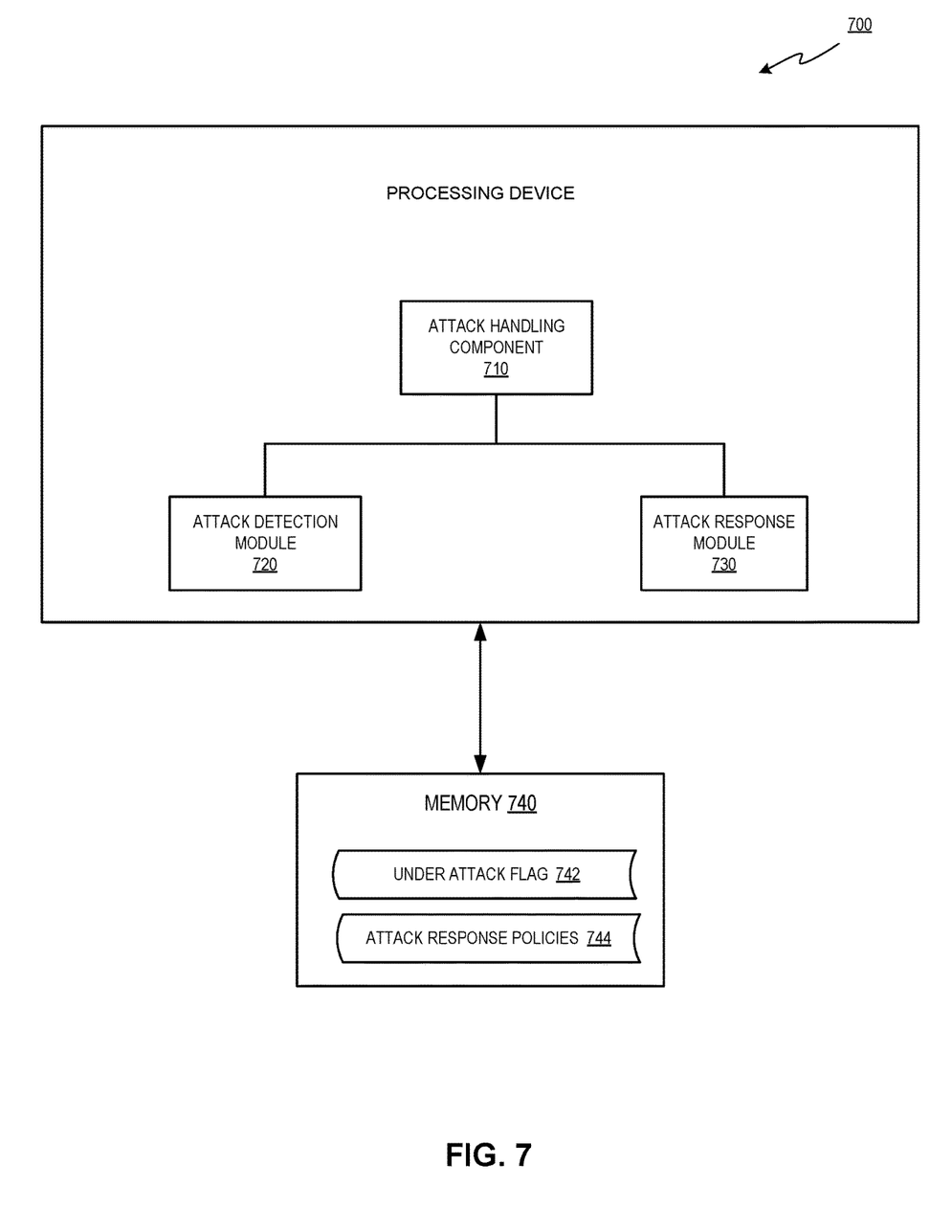
FIG. 7 depicts a block diagram of an illustrative apparatus operating in accordance with one or more aspects of the disclosure.

FIG. 7 depicts a block diagram of an illustrative apparatus 700 operating in accordance with one or more aspects of the disclosure. In various illustrative examples, apparatus 700 may be represented by computing environment 100 of FIG. 1. Apparatus 700 comprises a memory 740 and processing device operatively coupled to the memory 740 and executes code implementing attack handling component 710, attack detection module 720, and attack response module 730. Memory 740 may store under attack flag 742 and attack response policies 744 to store data as determined by the components of apparatus 700. Attack response module 730 may utilize attack response policies 744 to determine one or more actions to be performed by a process under attack. Memory 740 may further store under attack flag 742 that may be used attack detection module 720 to raise an indication that a process is under attack, based on detecting an event indicating the attack is taking place. The processing device of apparatus 700 may include an attack handling component 710 operating in accordance with one or more aspects of the present disclosure. In an illustrative example, attack handling component 710 may implement methods 200, 300, 400 and/or 600 of FIGS. 2, 3, 4, and 6.

Figure 8:
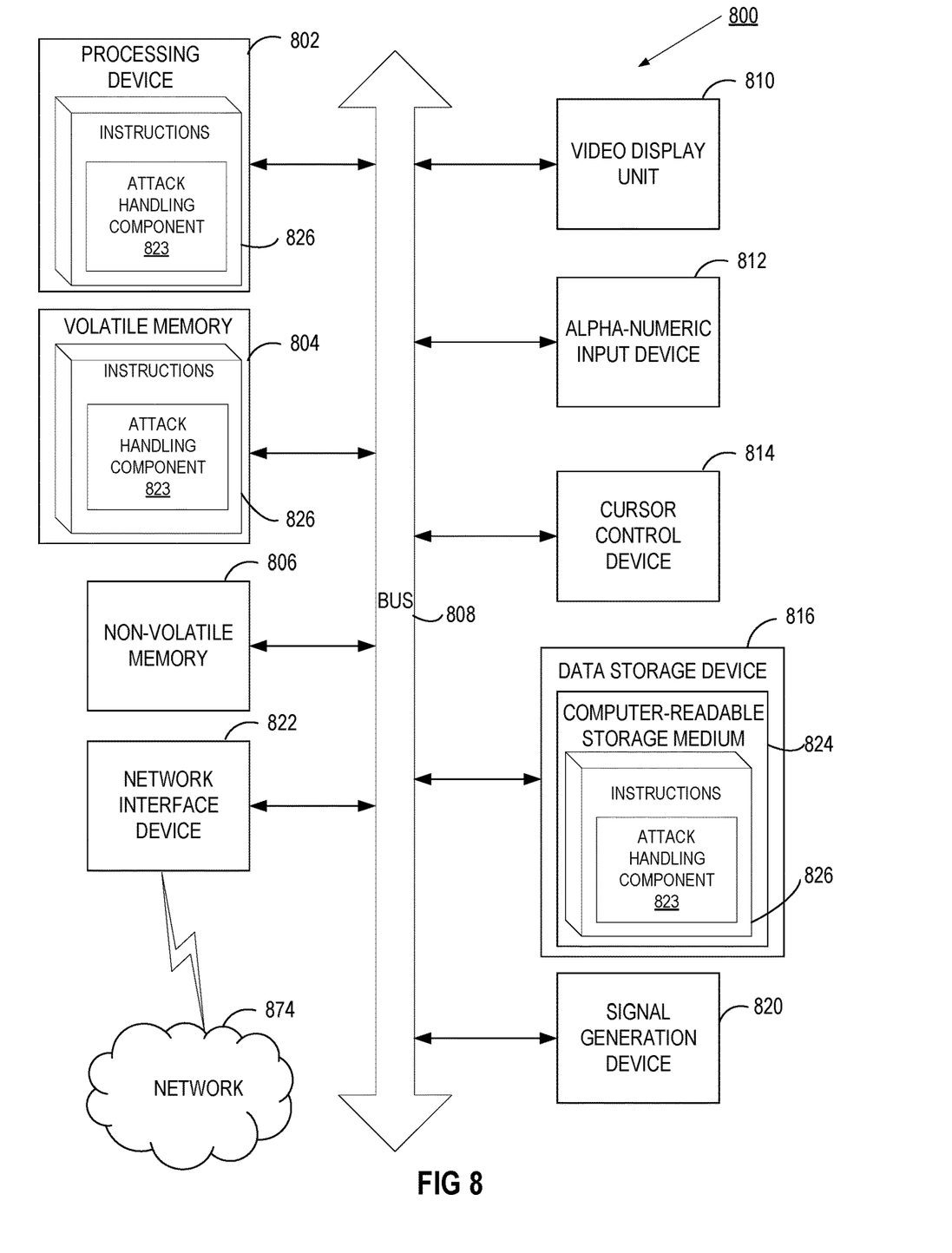
FIG. 8 illustrates a diagrammatic representation of a machine in the exemplary form of a computer system, in accordance with one or more aspects of the present disclosure.

FIG. 8 illustrates a diagrammatic representation of a machine in the exemplary form of a computer system 800 within which a set of instructions, for causing the machine to perform any one or more of the methodologies discussed herein, may be executed. The computer system 800 may correspond to computer system 100 of FIG. 1. In embodiments of the present invention, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory 816 (e.g., a data storage device), which communicate with each other via a bus 850.

The processing device 802 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 802 may therefore include multiple processors. The processing device 802 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 802 may also be one or more special-purpose processing devices such as an application specific integrated circuit (ASIC), a field programmable gate array (FPGA), a digital signal processor (DSP), network processor, or the like.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The secondary memory 821 may include a machine-readable storage medium (or more specifically a computer-readable storage medium) 828 on which is stored one or more sets of instructions 822 embodying any one or more of the methodologies or functions described herein (e.g., attack handling component 823). The instructions 822 may also reside, completely or at least partially, within the main memory 804 and/or within the processing device 802 during execution thereof by the computer system 800; the main memory 804 and the processing device 802 also constituting machine-readable storage media.

While computer-readable storage medium 828 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by component modules or functional circuitry within hardware devices. Further, the methods, components, and features may be implemented in any combination of hardware devices and computer program components, or in computer programs.

Unless specifically stated otherwise, terms such as "reading," "setting," "detecting," "obtaining," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300-400 of FIGS. 3-4 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

Other computer system designs and configurations may also be suitable to implement the systems and methods described herein. The following examples illustrate various implementations in accordance with one or more aspects of the present disclosure.

Example 1 is a method, comprising: detecting, by a first process executing in a trusted execution environment (TEE) of a host computer system, an event indicating that the first process is under attack from a second process executing on the host computer system; setting, by the first process, a flag within a memory region of the TEE indicating that the first process is under attack; and performing, by the first process and in view of an attack response policy associated with the first process, an action responsive to detecting the event.

Example 2 is a method of example 1, wherein the process is an infrastructure process executing at the TEE.

Example 3 is a method of example 2, wherein the flag is associated with the infrastructure process executing at the TEE.

Example 4 is a method of example 1, wherein the process is a software application executing within an infrastructure system.

Example 5 is a method of example 4, wherein setting the flag comprises sending a request to the infrastructure system to set the flag.

Example 6 is a method of example 4, wherein the software application is to send one or more network packets as a notification of the attack to other processes running within the TEE.

Example 7 is a method of example 1, wherein the action comprises at least one of: terminating execution of the first process, sending a notification, storing data and exiting, exiting after a predetermined wait time, or declining to restart the first process.

Example 8 is a method of example 1, wherein the event comprises at least one of: exceeding a threshold delay in executing a command by the process, an unexpected return value from an operation executed by the process, or an exit command to the host that is rejected by the host.

Example 9 is a method of example 1, wherein the attack response policy is one of a plurality of attack response policies associated with the first process, and wherein the attack response policy is selected based on a severity of the attack of the second process.

Example 10 is a method of example 1, wherein the flag is accessible to other processes executing at the TEE.

Example 11 is a system comprising: a memory; and a processing device operatively coupled to the memory, wherein the processing device is further to: detect an event indicating that a software application running within an infrastructure system deployed to a host computer system is under attack from a process executing on the host computer system, wherein the infrastructure system is executing in a trusted execution environment (TEE) of the host computer system; send a request to the infrastructure system to set a flag within a memory region of the TEE indicating that the software application is under attack; send a notification to other applications executing within the infrastructure system indicating the attack from the process; and perform, in view of an attack response policy associated with the software application, an action responsive to detecting the event.

Example 12 is a system of example 11, wherein to send a notification, the processing device is to send one or more network packets via a network interface device to a predetermined destination, the one or more network packets comprising information related to the attack.

Example 13 is a system of example 11, wherein the action comprises at least one of: terminating execution of the application, sending a notification, storing data then exiting, exiting after a predetermined wait time, or declining to restart the application.

Example 14 is a system of example 11, wherein the event comprises at least one of: exceeding a threshold delay in executing a command by the application, an unexpected return value from an operation executed by the application, or an exit command to the host that is rejected by the host.

Example 15 is a system of example 11, wherein the attack response policy is one of a plurality of attack response policies associated with the application, and wherein the attack response policy is selected based on a severity of the attack of the first process.

Example 16 is a non-transitory computer-readable storage medium comprising executable instructions that, when executed by a processing device, cause the processing device to: detect an event indicating that a first process executing in a trusted execution environment (TEE) of a host computer system is under attack from a second process executing on the host computer system; set a flag within a memory region of the TEE indicating that the first process is under attack; and perform, in view of an attack response policy associated with the first process, an action responsive to detecting the event.

Example 17 is a non-transitory computer-readable storage medium of example 16, wherein the process is an infrastructure process executing at the TEE, and wherein the flag is associated with the infrastructure process executing at the TEE.

Example 18 is a non-transitory computer-readable storage medium of example 16, wherein the process is a software application executing within an infrastructure system, and wherein to set the flag, the processing is to send a request to the infrastructure system to set the flag.

Example 19 is a non-transitory computer-readable storage medium of example 16, wherein the action comprises at least one of: terminating execution of the first process, sending a notification, storing data then exiting, exiting after a predetermined wait time, or declining to restart the first process.

Example 20 is a non-transitory computer-readable storage medium of example 16, wherein the event comprises at least one of: exceeding a threshold delay in executing a command by the first process, an unexpected return value from an operation executed by the first process, or an exit command to the host that is rejected by the host.

Example 21 is an apparatus comprising: a means to detect, by a first process executing in a trusted execution environment (TEE) of a host computer system, an event indicating that the first process is under attack from a second process executing on the host computer system; a means to set, by the first process, a flag within a memory region of the TEE indicating that the first process is under attack; and a means to perform, by the first process and in view of an attack response policy associated with the first process, an action responsive to detecting the event.

Example 22 is an apparatus of example 21, wherein the process is an infrastructure process executing at the TEE.

Example 23 is an apparatus of example 22, wherein the flag is associated with the infrastructure process executing at the TEE.

Example 24 is an apparatus of example 21, wherein the process is a software application executing within an infrastructure system.

Example 25 is an apparatus of example 24, wherein setting the flag comprises a means to send a request to the infrastructure system to set the flag.

Example 26 is an apparatus of example 24, wherein the software application is to send one or more network packets as a notification of the attack to other processes running within the TEE.

Example 27 is an apparatus of example 21, wherein the action comprises at least one of: a means to terminate execution of the first process, a means to send a notification, storing data and exiting, a means to exit after a predetermined wait time, or declining to restart the first process.

Example 28 is an apparatus of example 21, wherein the event comprises at least one of: exceeding a threshold delay in executing a command by the process, an unexpected return value from an operation executed by the process, or an exit command to the host that is rejected by the host.

Example 29 is an apparatus of example 21, wherein the attack response policy is one of a plurality of attack response policies associated with the first process, and wherein the attack response policy is selected based on a severity of the attack of the second process.

Example 30 is an apparatus of example 21, wherein the flag is accessible to other processes executing at the TEE.

Example 31 is an electronic device comprising: a memory; and a processing device operatively coupled to the memory, wherein the processing device is further to: detect an event indicating that a software application running within an infrastructure system deployed to a host computer system is under attack from a process executing on the host computer system, wherein the infrastructure system is executing in a trusted execution environment (TEE) of the host computer system; send a request to the infrastructure system to set a flag within a memory region of the TEE indicating that the software application is under attack; send a notification to other applications executing within the infrastructure system indicating the attack from the process; and perform, in view of an attack response policy associated with the software application, an action responsive to detecting the event.

Example 32 is an electronic device of example 31, wherein to send a notification, the processing device is to send one or more network packets via a network interface device to a predetermined destination, the one or more network packets comprising information related to the attack.

Example 33 is an electronic device of example 31, wherein the action comprises at least one of: terminating execution of the application, sending a notification, storing data then exiting, exiting after a predetermined wait time, or declining to restart the application.

Example 34 is an electronic device of example 31, wherein the event comprises at least one of: exceeding a threshold delay in executing a command by the application, an unexpected return value from an operation executed by the application, or an exit command to the host that is rejected by the host.

Example 35 is an electronic device of example 31, wherein the attack response policy is one of a plurality of attack response policies associated with the application, and wherein the attack response policy is selected based on a severity of the attack of the first process.

What is claimed is:

1. A method, comprising:
    detecting, by a first process executing in a trusted execution environment (TEE) of a host computer system, an event indicating that the first process is under an attack from a second process executing on the host computer system;
    setting, by the first process, a flag within a memory region of the TEE indicating that the first process is under the attack, wherein the set flag enables at least the first process to reject an attempt to restart itself after the first process has been terminated;
    notifying, by the first process, other processes running within the TEE that the first process is under the attack, wherein the other processes take measures to mitigate the attack; and
    performing, by the first process and in view of an attack response policy associated with the first process, an action responsive to detecting the event.

2. The method of claim 1, wherein the first process is an infrastructure process executing at the TEE.

3. The method of claim 2, wherein the flag is associated with the infrastructure process executing at the TEE.

4. The method of claim 1, wherein the first process is a software application executing within an infrastructure system.

5. The method of claim 4, wherein setting the flag comprises sending a request to the infrastructure system to set the flag.

6. The method of claim 4, wherein the software application is to send one or more network packets as a notification of the attack to the other processes running within the TEE.

7. The method of claim 1, wherein the action comprises at least one of: terminating execution of the first process, sending a notification, storing data and exiting, exiting after a predetermined wait time, or declining to restart the first process.

8. The method of claim 1, wherein the event comprises at least one of:
    exceeding a threshold delay in executing a command by the first process,
    an unexpected return value from an operation executed by fest the first process, or
    an exit command to a host that is rejected by the host.

9. The method of claim 1, wherein the attack response policy is one of a plurality of attack response policies associated with the first process, and wherein the attack response policy is selected based on a severity of the attack of the second process.

10. The method of claim 1, wherein the flag is accessible to the other processes executing at the TEE.

11. A system comprising:
    a memory; and
    a processor operatively coupled to the memory, wherein the processor is further to:
    detect an event indicating that a software application running within an infrastructure system deployed to a host computer system is under an attack from a process executing on the host computer system, wherein the infrastructure system is executing in a trusted execution environment (TEE) of the host computer system;

send a request to the infrastructure system to set a flag within a memory region of the TEE indicating that the software application is under the attack, wherein the set flag enables at least the software application to reject an attempt to restart itself after the software application has been terminated;

send a notification to other applications executing within the infrastructure system indicating the attack from the process, wherein the other applications take measures to mitigate the attack; and perform, in view of an attack response policy associated with the software application, an action responsive to detecting the event.

12. The system of claim 11, wherein to send the notification, the processor is to send one or more network packets via a network interface device to a predetermined destination, the one or more network packets comprising information related to the attack.

13. The system of claim 11, wherein the action comprises at least one of: terminating execution of the software application, storing data then exiting, exiting after a predetermined wait time, or declining to restart the software application.

14. The system of claim 11, wherein the event comprises at least one of:
   exceeding a threshold delay in executing a command by the software application,
   an unexpected return value from an operation executed by the software application, or
   an exit command to a host that is rejected by the host.

15. The system of claim 11, wherein the attack response policy is one of a plurality of attack response policies associated with the software application, and wherein the attack response policy is selected based on a severity of the attack of the process.

16. A non-transitory computer-readable storage medium comprising executable instructions that, when executed by a processing device, cause the processing device to:

detect an event indicating that a first process executing in a trusted execution environment (TEE) of a host computer system is under an attack from a second process executing on the host computer system;

set a flag within a memory region of the TEE indicating that the first process is under the attack, wherein the set flag enables at least the first process to reject an attempt to restart itself after the first process has been terminated;

notify other processes running within the TEE that the first process is under the attack, wherein the other processes take measures to mitigate the attack; and perform, in view of an attack response policy associated with the first process, an action responsive to detecting the event.

17. The non-transitory computer-readable storage medium of claim 16, wherein the first process is an infrastructure process executing at the TEE, and wherein the flag is associated with the infrastructure process executing at the TEE.

18. The non-transitory computer-readable storage medium of claim 16, wherein the first process is a software application executing within an infrastructure system, and wherein to set the flag, the processing device is to send a request to the infrastructure system to set the flag.

19. The non-transitory computer-readable storage medium of claim 16, wherein the action comprises at least one of: terminating execution of the first process, sending a notification, storing data then exiting, exiting after a predetermined wait time, or declining to restart the first process.

20. The non-transitory computer-readable storage medium of claim 16, wherein the event comprises at least one of:
   exceeding a threshold delay in executing a command by the first process,
   an unexpected return value from an operation executed by the first process, or
   an exit command to a host that is rejected by the host.

* * * * *